US009026783B2

(12) United States Patent
Roskind et al.

(10) Patent No.: US 9,026,783 B2
(45) Date of Patent: May 5, 2015

(54) LOW LATENCY SERVER-SIDE REDIRECTION OF UDP-BASED TRANSPORT PROTOCOLS TRAVERSING A CLIENT-SIDE NAT FIREWALL

(71) Applicant: Google Inc., Mountain View, CA (US)

(72) Inventors: James Anthony Roskind, Redwood City, CA (US); Ian Douglas Swett, Boston, MA (US)

(73) Assignee: Google Inc., Mountain View, CA (US)

( * ) Notice: Subject to any disclaimer, the term of this patent is extended or adjusted under 35 U.S.C. 154(b) by 103 days.

(21) Appl. No.: 13/789,396

(22) Filed: Mar. 7, 2013

(65) Prior Publication Data

US 2014/0258705 A1    Sep. 11, 2014

(51) Int. Cl.
*H04L 29/06* (2006.01)
*H04L 29/08* (2006.01)

(52) U.S. Cl.
CPC ............. *H04L 63/029* (2013.01); *H04L 63/04* (2013.01); *H04L 67/2814* (2013.01)

(58) Field of Classification Search
None
See application file for complete search history.

(56) References Cited

U.S. PATENT DOCUMENTS

| | | | |
|---|---|---|---|
| 5,951,694 A * | 9/1999 | Choquier et al. | 714/15 |
| 7,490,162 B1 | 2/2009 | Masters | |
| 8,397,282 B2 * | 3/2013 | Turley et al. | 726/11 |
| 2002/0002611 A1 * | 1/2002 | Vange | 709/223 |
| 2003/0074453 A1 | 4/2003 | Ikonen | |
| 2009/0124387 A1 * | 5/2009 | Perlman et al. | 463/42 |
| 2009/0234968 A1 * | 9/2009 | Thomas et al. | 709/241 |
| 2011/0153723 A1 | 6/2011 | Mutnuru et al. | |
| 2012/0158971 A1 * | 6/2012 | Takahashi | 709/226 |

FOREIGN PATENT DOCUMENTS

WO    WO-2006/074023 A2    7/2006

\* cited by examiner

*Primary Examiner* — Jeffrey Pwu
*Assistant Examiner* — Wasika Nipa
(74) *Attorney, Agent, or Firm* — McDermott Will & Emery LLP

(57) ABSTRACT

Systems, methods, and machine-readable media for low latency server-side redirection of User Datagram Protocol (UDP)-based transport protocols traversing a client-side Network Address Translation (NAT) are provided. At a first server, a request for directing a data resource to a client may be received. The request may be received from the client or a back-end server trying to push the data resource to the client. The first server may lack the data resource or the resources to provide the data resource to the client. A second server may be determined for responding to the request. The request may be redirected to the second server. The first server may provide for the second server to connect to the client and directly respond to the request. The second server may have not been previously connected to the client.

19 Claims, 4 Drawing Sheets

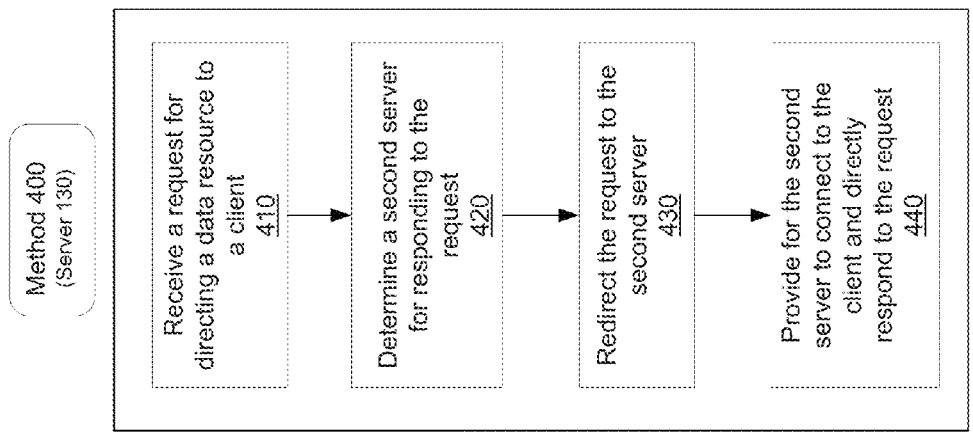
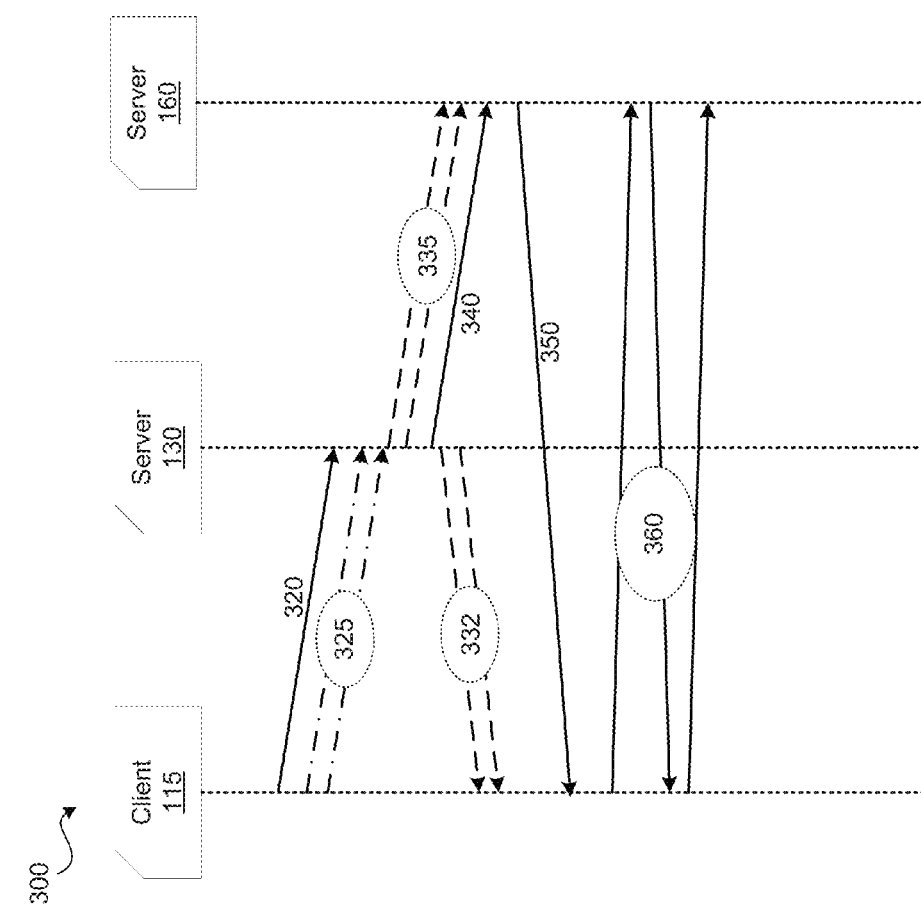
Figure 3
Figure 4

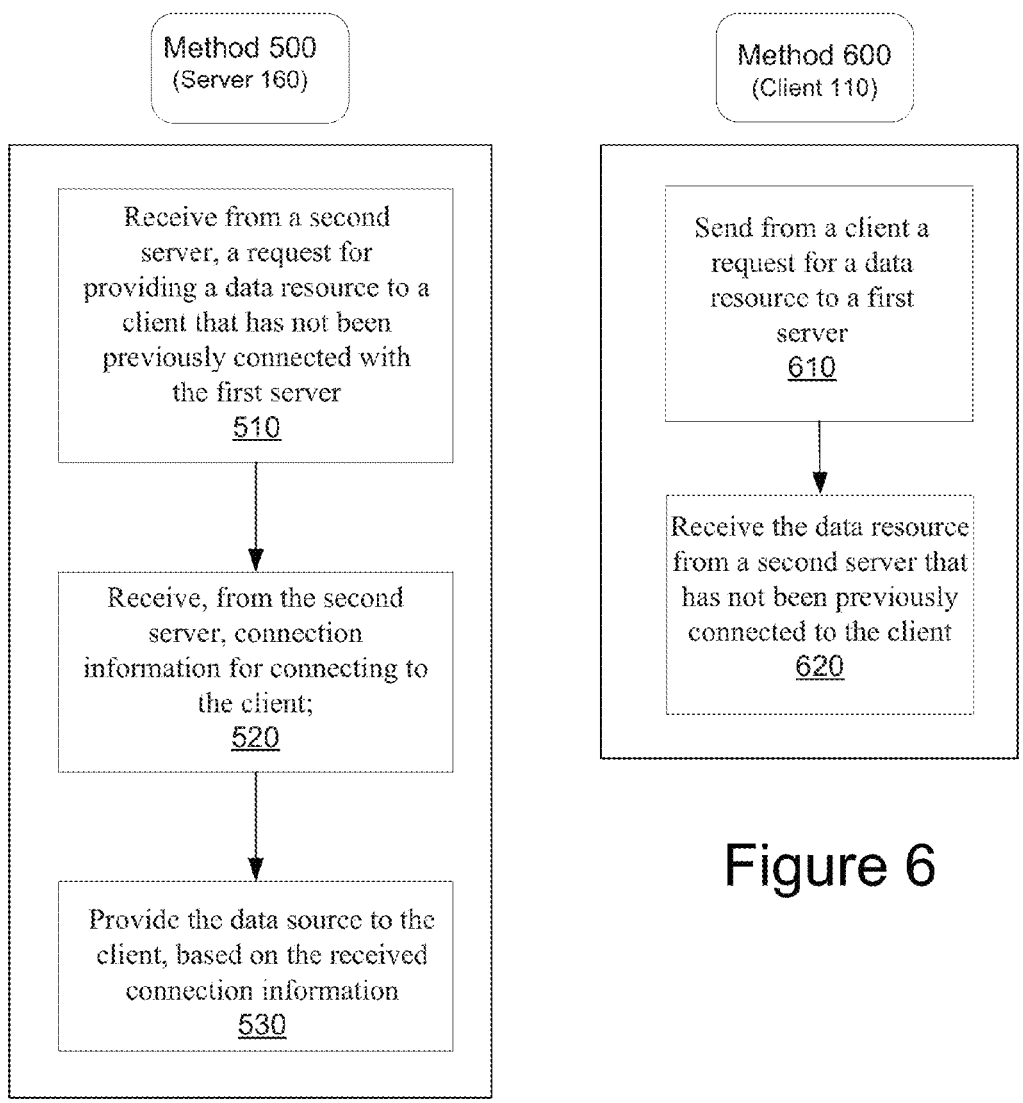

LOW LATENCY SERVER-SIDE REDIRECTION OF UDP-BASED TRANSPORT PROTOCOLS TRAVERSING A CLIENT-SIDE NAT FIREWALL

TECHNICAL FILED

The present description relates generally to client-server communications, and more particularly, but not exclusively, to low latency server-side redirection of User Datagram Protocol (UDP)-based transport protocols optionally traversing a client-side Network Address Translation (NAT) firewall.

BACKGROUND

Reducing latency in client-server communications may be critical, in several contexts, to user satisfaction and increased Internet usage. Clients, such as browsers, may routinely transact across the Internet with one or more servers. At times, a contacted server may be incapable or unwilling to respond to a request from a client. This may happen, for example, because of lack of a data resource or the server being unwilling due to lack of CPU or other resources. In those cases, the server may perform a server-side redirect and instruct the client to contact a different server to obtain the data resource (e.g., content, such as media content). Server-side redirects may be time consuming in terms of latency. For instance, the contacted server may send a message to the client suggesting that the client contact a second server, costing one Internet traversal. Having the client establish a connection to said second server may then cost one Internet Round-Trip Time (RTT). The client may have to secure the connection, for example, by a HELLO exchange to start a Secure Sockets Layer (SSL) or Transport Layer Security (TLS) message, which can then cost a second RTT.

SUMMARY

According to one aspect of the subject technology, a computer implemented method may include receiving, at a first server, a request for directing a data resource to a client. A second server may be determined for responding to the request. The request may be redirected to the second server. The first server may provide for the second server to connect to the client and directly respond to the request. The second server may have not been previously connected to the client.

According to another aspect of the subject technology, a computer implemented method may include sending, from a client, a request for a data resource to a first server. The data resource may be received from a second server that has not been previously connected to the client. Receiving the data resource from the second server may be facilitated by the first server through redirecting the request to the second server, and providing for the second server to connect to the client and directly respond to the request. The first server may lack the requested data resource or resources for providing the requested data resource.

According to yet another aspect of the subject technology, a computer implemented method may include receiving, at a first server, from a second server, a request for providing a data resource to a client that has not been previously connected with the first server. Connection information for connecting to the client may be received from the second server. The data resource may be provided to the client, based on the received connection information. The client may be protected by a firewall that blocks unmarked data from traversing toward the client. The second server may lack the requested data resource or resources for providing the requested data resource.

According to yet another aspect of the subject technology, a system may include a memory to store instructions and a processor configured to execute the instructions to perform the following actions: receiving a request for directing a data resource to a client; determining a server for responding to the request; redirecting the request to the second server; provide for the server to connect to the client and directly respond to the request. The server may have not been previously connected to the client.

According to yet another aspect of the subject technology, a system may include a memory to store instructions and a processor configured to execute the instructions to perform the following actions: receiving from a server a request for providing a data resource to a client that has not been previously connected with the system and connection information for connecting to the client; retrieving the data resource from the memory; sending the retrieved data resource to the client based on the received connection information. The client may be protected by a firewall that blocks unmarked data from traversing toward the client. The server may lack the requested data resource or resources for providing the requested data resource.

According to yet another aspect of the subject technology, a non-transitory machine-readable medium may include instructions stored therein, which when executed by a machine, cause the machine to perform the following operations: receiving, at a first server, a request for directing a data resource to a client; determining a second server for responding to the request; redirecting the request to the second server; and providing for the second server to connect to the client and directly respond to the request. The second server may have not been previously connected to the client. Receiving the request may include receiving the request from the client.

According to yet another aspect of the subject technology, a non-transitory machine-readable medium may include instructions stored therein, which when executed by a machine, cause the machine to perform the following operations: receiving, at a first server, from a second server, a request for providing a data resource to a client that has not been previously connected with the first server; receiving, from the second server, connection information for connecting to the client; and providing the data resource to the client, based on the received connection information. The client may be protected by a firewall that blocks unmarked data from traversing toward the client. The second server may lack the requested data resource or resources for providing the requested data resource.

According to yet another aspect of the subject technology, a system for providing low latency server-side redirection of User Datagram Protocol (UDP)-based transport protocols may include: means for receiving, at a first server, a request for directing a data resource to a client; means for determining a second server for responding to the request; means for redirecting the request to the second server; and means for providing for the second server to connect to the client and directly respond to the request, wherein the second server has not been previously connected to the client.

According to yet another aspect of the subject technology, a system for providing low latency server-side redirection of UDP-based transport protocols may include: means for sending from a client a request for a data resource to a first server; and means for receiving the data resource from a second server that has not been previously connected to the client. Receiving the data resource from the second server may be facilitated by the first server through means for redirecting the request to the second server, and means for providing for the second server to connect to the client and directly respond to the request. The first server may lack the requested data resource or resources for providing the requested data resource.

According to yet another aspect of the subject technology, a system for providing low latency server-side redirection of UDP-based transport protocols may include: means for receiving informative messages from the first server; means for receiving second connection messages including packets from the second server before receiving informative messages from the first server; means for queuing up and delaying processing of the second connection messages; and means for responding to the second connection messages by sending packets to the second server, rather than to initial source IP and port addresses of packets associated with the second connection.

According to yet another aspect of the subject technology, a system for providing low latency server-side redirection of UDP-based transport protocols may include means for performing any of the methods provided herein.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

FIG. 3 is a sequence diagram illustrating an example of a message flow between the servers and the client of FIG. 1, in accordance with one aspect of the subject technology.

FIG. 4 is a flow diagram illustrating an example of a method for low latency redirection of UDP-based transport protocols traversing a client-side NAT, in accordance with one aspect of the subject technology.

FIG. 5 is a flow diagram illustrating an example of a method for low latency server-side redirection of UDP-based transport protocols traversing a client-side NAT, in accordance with one aspect of the subject technology.

FIG. 6 is a flow diagram illustrating an example of a method for low latency server-side redirection of UDP-based transport protocols traversing a client-side NAT, in accordance with one aspect of the subject technology.

DETAILED DESCRIPTION

Disclosed herein are systems and methods for low latency server-side redirection of User Datagram Protocol (UDP)-based transport protocols traversing a client-side Network Address Translation (NAT). In one or more aspects of the subject technology, a protocol may be developed that provides a set of stream transports that traverse the Internet. An example of such a protocol may include the current protocol development of Quick UDP Internet Connection (QUIC), or standardized protocol Datagram Transport Layer Security (DTLS), either of which may be built atop UDP. Other examples may include the SPDY protocol, the Transport Layer Security (TLS) protocol, or the Secure Sockets Layer (SSL) protocol, which can run across Transport Control Protocol (TCP). In some aspects, a client, such as a browser, may contact a first server and form a first connection to a first server. The first connection may traverse a client-side firewall, such as a NAT firewall. The client may request from the first server a data resource that the first server may lack or may not have resources to provide. The first server may redirect the request to a second server to provide the client with the requested data resource as described in more detail herein.

Figure 1:
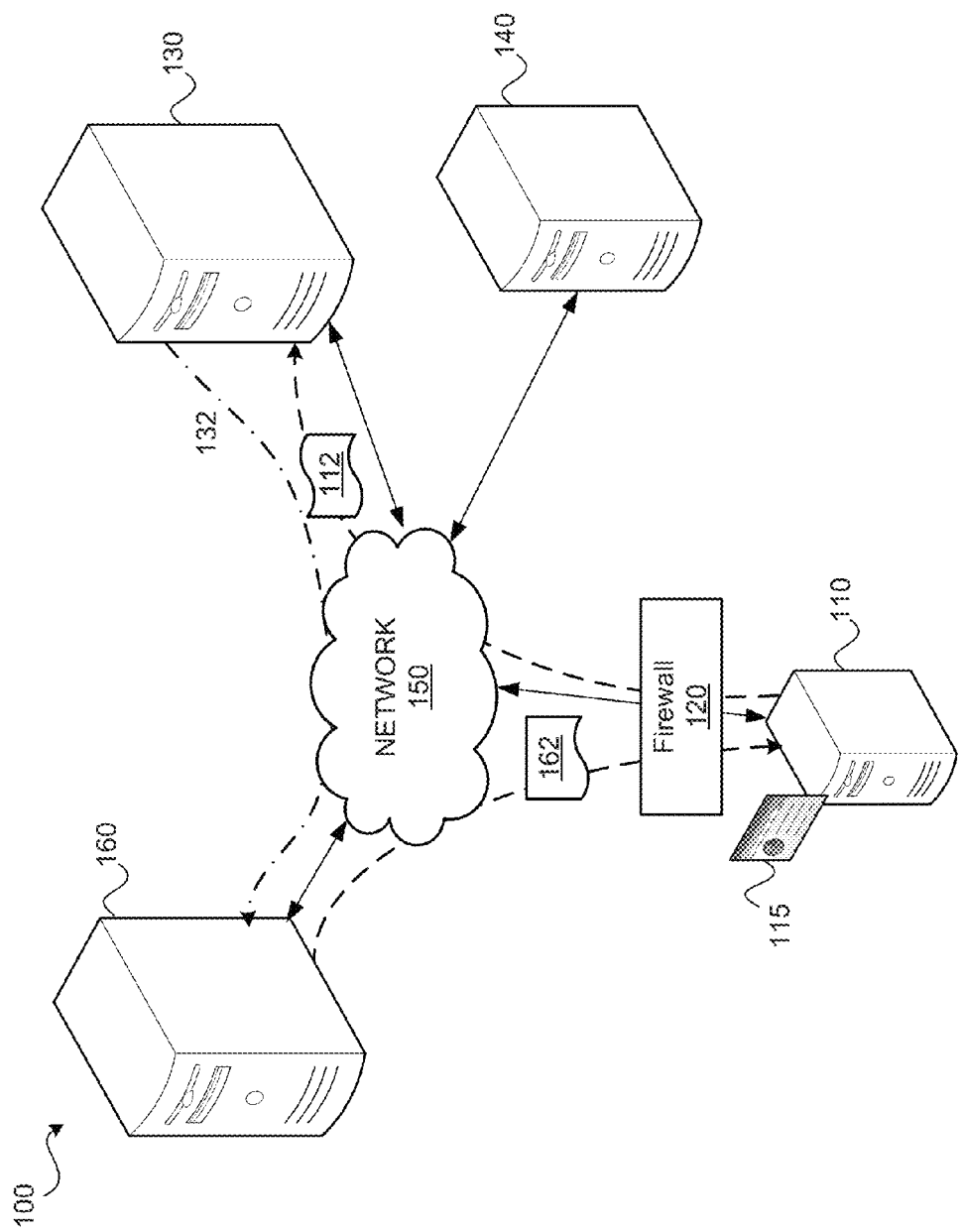
FIG. 1 is a conceptual diagram illustrating an example of a network environment for low latency server-side redirection of User Datagram Protocol (UDP)-based transport protocols traversing a client-side Network Address Translation (NAT) firewall, in accordance with one aspect of the subject technology.

FIG. 1 is a conceptual diagram illustrating an example of a network environment 100 for low latency server-side redirection of UDP-based transport protocols traversing a client-side NAT firewall 120, in accordance with one aspect of the subject technology. The network environment 100 may include a client device 110 protected by a firewall 120, first server 130 (hereinafter, "server 130"), and a second server 160 (hereinafter, "server 160") coupled via a network 150 (e.g., the Internet). In one or more aspects the network environment may include other servers such as a back-end server 140. The client device 110 may include a client application 115 (e.g., a web browser, such as Chrome, Firefox, Internet Explorer, etc.). The client application 115 may establish a first connection with server 130 to send a request 112 (e.g., a Hyper-Text Transport Protocol (HTTP) request) to the server 130 for a data resource (e.g., a web resource such as a web page, media content including one or more audio or video files, or a document including one or more text and/or image files, etc.). In one or more aspects, the client may connect to a number of servers of the network environment 100 requesting the data resource.

In some aspects, the server 130 may not have the requested data resource to respond to the request 112, or the server 130 may be too busy or may lack the resources (e.g., processing power) to respond to the request 112. In one or more aspects, the server 130 may not receive the request 112 from the client 115, but be motivated by one or more events, including for instance, a directive received from the back-end server 140 to push certain data to the client 115. In another example, the client application 115 may have requested an image or a document, using which may require another file that, although not requested by the client, but may be pushed to the client by the server 130 or another server (e.g., server 160).

In some aspects, the server 160 (which has no active connection to the client 115) at the time the request 112 is made may be known to the server 130. The client-side firewall 120 may block data, such as UDP packets or TCP packets, from traversing the firewall 120 toward the client 115, unless the packets are properly marked. One example of proper marking for traversing the firewall 120 may include having an expected destination address (e.g., a possibly NAT produced destination IP and port address), as well as an IP address of the server 130 that is listed as a source address. In another example, the proper marking may be further restricted to include the port address of the server 130.

In an aspect, the server 130 may be unable to provide some of the requested data resource to the client application 115 via the first connection. The server 130, however, may know another server, such as server 160 that can provide the client application 115 with the requested data resource. The server 160 may trust server 130 as both may be maintained by the same entity (e.g., a corporation, a data center, etc.). In an aspect, the server 160 may be located at a closer distance to the client device 110 than the server 130. The server 160, therefore, can respond to the request 112 with a shorter latency. For example, the client device 110 may be in Taiwan and the server 130 may be located in the United States. In this case, if the server 130 knows a server in China (e.g., server 160) that can respond to the request 112 made by the client 115, the server 130 may redirect the request 112 to the server 160.

In a traditional redirect, the server 130 may send a message to the client application 115 across the first connection, directing the client application 115 to form a second connection to the server 160, and acquire the desired data. For example, the client application 115 may then proceed to initiate a second connection to the server 160 to form the second connection. The client application 115 may send a SYN packet and receive an SYN-ACK packet to establish a TCP connection, or may send a QUIC HELLO packet to initiate a QUIC connection. Alternatively, the client application 115 may send cryptographic messages on the second connection to secure the connection. For example, a client may exchange TLS or SSL HELLO message(s) across a TCP connection to establish a secure connection, or may depend on QUIC HELLO packet to secure the connection. For example, an HTTP GET request may be sent across a TCP, SSL, or TLS connection, or a framed SPDY request may be sent across a SPDY connection running atop TLS or SSL, or a framed QUIC request may be sent across a QUIC connection.

According to one or more aspects of the subject technology, prior to the need for the server 130 to redirect the request 112 to the server 160, the client application 115 may send preparatory data to the server 130. An example of preparatory data is cryptographic materials sufficient for sending messages to the server 160 on behalf of the client 115. In another example, where the client application 115 may form the second connection to the second server in the form of a QUIC connection, such cryptographic material may include an acceptable client selected Global User Identification (GUID) that identifies traffic as being part of a specific QUIC connection. In that same example involving the formation of the QUIC connection, cryptographic material may include a Diffie-Hellman public key. The Diffie-Hellman public key may be used in a QUIC HELLO packet to establish perfect forward secrecy, as well as a master secret, for use in constructing a session's symmetric key. The redirect may be more efficiently performed by the server 130 redirecting the request to the server 160 over a connection 132. The server 160 may then directly provide the data resource 162 to the client 115, as described in more detail herein.

Figure 2:
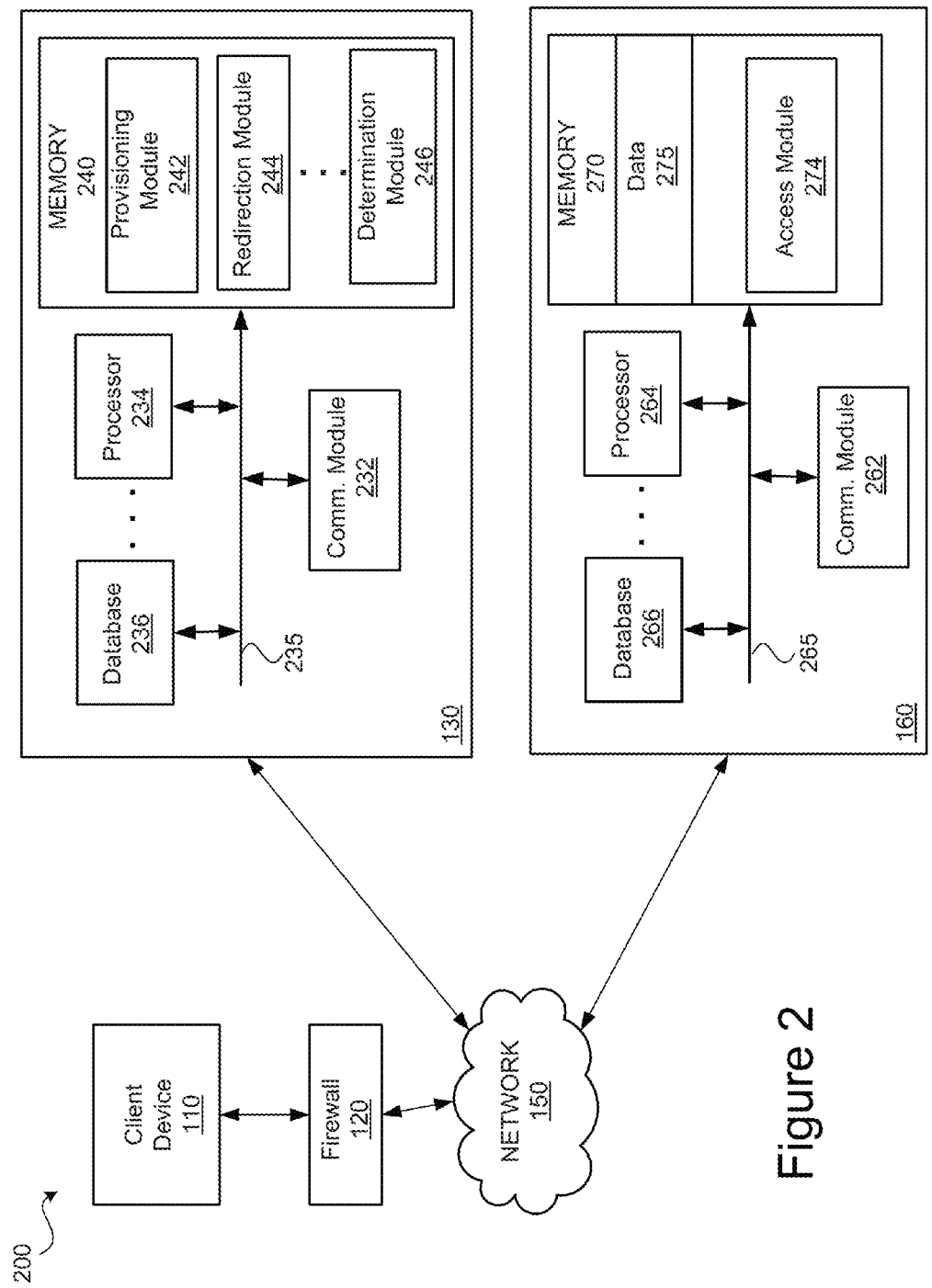
FIG. 2 is a block diagram illustrating an example of a system for low latency server-side redirection of UDP-based transport protocols traversing a client-side NAT, in accordance with one aspect of the subject technology.

FIG. 2 is a block diagram illustrating an example of a system 200 for low latency server-side redirection of UDP-based transport protocols traversing a client-side NAT firewall 120, in accordance with one aspect of the subject technology. The system 200 may include the client device 110, protected by the firewall 120, the server 130 and the server 160, coupled together via the network 150.

The client device 110 may include any system or device having a processor, a memory, and communications capability for communicating via the network 150. The client device 110 may use the client application 115 (e.g., a browser) of FIG. 1 to connect to the network 150, and through the network 150, to other devices or servers (e.g., server 130 and 160).

The server 130 may include a communication module 232, a processor 234, a database 236 and a memory 240. The memory 240 may store data and one or more software modules, such as provisioning module 242, redirection module 244, and determination module 246. In one or more aspects, the provisioning module 242, redirection module 244, and determination module 246 may be implemented in hardware such as Field Programmable Gate Arrays (FPGA). A bus 235 may communicatively couple various components of the server 130, for example the communication module 232, the processor 234, the database 236, and the memory 240. The communication module 232 may include a transceiver, including a wireless transceiver that can communicate over the network 150.

In one or more aspects, the communication module 232 may receive a request for directing a data resource (e.g., a web page, media content including one or more audio or video files, or a document including one or more text and/or image files, etc.) to the client 115. The request may include the request 112 of FIG. 1 received from the client 115. In an aspect, the request may be received from a back-end server 140 of FIG. 1 asking server 130 to push the data resource to the client 115. The server 130 may lack the data resource or may not have the bandwidth or resources (e.g., processing power) to respond to the request. The determination module 246 may determine that server 160 is able to provide the requested data resource to the client 115. The determination module 246 may use lists, tables, or other data stored in the memory 240 or the database 236 to find the server 160. The determining module 246 may determine that the server 160 is able to respond to the request 112. The determining module 246 may also determine that the server 160 would able to respond to the request 112 with a comparable or lower latency than the server 130 if the server 130 directly responded to the request. In an aspect, the server 160 may be one of a group of servers maintained by an entity, such as a corporation, data center, etc. The server 160 may not be in connection with the client 115 at the time that the request 112 is submitted to the server 130.

The communication module 232 may establish a connection (e.g., 132 of FIG. 1) with the server 160 and ask the redirection module 244 to redirect the request for the data resource to the server 160. The redirection module 244 may obtain connection information associated with the server 160, such as IP and port addresses of the server 160 from memory 240 or the database 236, and provide the connection information to the communication module 232. The provisioning module 246 may provide connection information for connecting to the client application 115 to the server 160. In one or more aspects, the provisioning module 246 may provide the server 160 with a key that is provided to the server 130 by the client 115. The server 160 may use the key to establish a connection to the client application 115 that can pass the firewall 120. The firewall 120 may be a NAT firewall that protects the client device 110 by blocking unmarked data packets, including data packets that lack an identifiable source address and a destination address. The identifiable source address may include an IP address of the server 130, and the destination address may include an IP address of the client application 115 including NAT-produced IP and port addresses. In an aspect, the identifiable source address may further include a port address associated with the server 130.

In one or more aspects, prior to redirecting the request by the server 130 to the server 160, the server 130 (via the communication module 232) may receive preparatory data from the client 115. The preparatory data may include cryptographic materials for encrypting messages for sending to the server 160 on behalf of the client 115. The cryptographic materials may include a client (e.g. client 115) selected GUID, a public key including a Diffie-Hellman Public Key, or a master secret for constructing a session symmetric key. The communication module 232 may send the cryptographic materials to the server 160 as part of redirecting the request 112 to the server 160.

In addition, the communication module 232 may send one or more server-server messages directly to the server 160. The one or more server-server messages may include similar content as a message that the client application 115 had to use to establish a second connection to the server 160. In as aspect, the one or more server-server messages may include the preparatory data.

The provisioning module 246 may be configured to use the cryptographic data to construct packets substantially similar to that which server 160 expected to receive from the client application 115 if the client application 115 had sent the request directly to the server 160. The communication module 232 may be configured to send the constructed packets to the server 160. The constructed packets may include QUIC cryptographic HELLO packets based on the preparatory data received from the client 115. The constructed packets may include spoofed source IP and port addresses that match the IP and port addresses associated with the client application 115 (e.g., NAT outbound IP and port addresses), which are provided to be sufficient to traverse the firewall 120. The constructed packets may include source IP and port addresses for server 160, which may be spoofed by server 130, in order to facilitate traversal of the firewall 120 and reach client 115.

In one or more aspects of the subject technology, the communication module 232 may send one or more informative messages to the client 115. The informative messages may indicate details of a connection initiation done by the server 130 via the one or more server-server messages. The details of the connection initiation may include actual IP and port addresses that can be used by the client application 115 to reach the server 160. The details of connection initiation may also include the actual contents of the constructed packets, a packet sequence number used in the constructed packets, or some portions of checksums or Hash-based Message Authentication Codes (HMACs) of messages that can be used to authenticate or validate future messages to be sent by the client application 115 to the server 160 on the second connection.

In some aspects, if the client application 115 receives packets (e.g., second connection messages) from the server 160 before receiving informative messages from the server 130, the client application 115 may queue up and delay processing of the second connection messages. For example, in a QUIC connection, the packets arriving with the distinctive preparatory GUID may be queued. Similarly, packets arriving with a packet sequence number not associated with the first connection (e.g., connection to the server 130) may be queued when the second connection is initiated over TCP. In an aspect, the client application 115 may respond to the second connection messages by sending packets to the server 160, rather than the initial source IP and port of the second connection's packets. In the QUIC connection formation example, the source IP and port may initially be spoofed by the server 160, and would be ignored by the client 115. Instead, the IP and port addresses associated with the server 160 provided in the informative messages, or provided within initial messages from the server 160, may be used. In some aspects, the second connection may migrate over time to use its own client NAT IP and port address. For example, in the QUIC case, when the server 160 receives second connection messages from the client 115, a new NAT port association may be created, so that the server 130 can proceed to respond to that port, rather than continuing to share the port used by the first connection to reach the client 115.

The server 160 may include a communication module 262, a processor 264, a database 266, and a memory 270. The memory 270 may store data 275, and one or more software modules, such an access module 274. In one or more aspects, the access module 274 may be implemented in hardware such as a FPGA. A bus 265 may communicatively couple various components of the server 160, for example the communication module 262, the processor 264, the database 266, and the memory 270. The communication module 262 may include a transceiver, including a wireless transceiver that can communicate over the network 150.

The communication module 262 may receive from the server 130 a request for providing a data resource to the client application 115 that has not been previously connected with the server 160. The communication module 262 may also receive connection information for connecting to the client application 115 from the server 130. The access module 274 may be configured to retrieve information from the database 266. The data base 236 may store various data including the requested data resource. In an aspect the requested data resource may be available from the stored data 275 in memory 270. The access module 274 may retrieve the data resource from the memory 270 or the database 266 and provide the data resource to the communication module 262. The communication module 262 may send the retrieved data resource to the client 115, using the received connection information from the server 130. The connection information received from the server 130 may include a key to establish a connection to the client application 115 that can pass the firewall 120.

In an aspect, the communication module 262 may send the data resource to the client application 115 with substantially similar security as if the server 130 provided the client application 115 with the data resource. The communication module 262 may receive one or more server-server messages from the server 130, which may include similar content as a message sent by the client 115, that the server 130 would have to use to establish a connection to the server 160. For example, the one or more server-server messages may include the preparatory data received by the server 130 from the client 115. In an aspect, the one or more server-server messages may include attestation by the server 130 regarding the ownership of the source IP and port addresses communicated by the server 130 to the server 160. For example, the attestation may be sufficient to allow, in the QUIC negotiation example, the server 160 to trust the channel sufficiently so that it may not need to test the channel via a round trip connection to the client.

The communication module 262 may receive constructed packets from the server, which may include packets that the server 160 would expect to receive from the client 115, if the client application 115 had sent the request directly to the server 160. The constructed packets may have been constructed by using the cryptographic data received from the client 115, as discussed above. For example, the constructed packets may include QUIC cryptographic HELLO packets based on the preparatory data and/or spoofed source IP and port addresses that may match client IP and port addresses (e.g., NAT outbound IP and port addresses), and can be sufficient to traverse the firewall 120. The one or more server-server messages may include a request that an initial message from the server 160 to the client application 115 use a spoofed source IP address or a spoofed source port address. As another example, the server 160 may be asked to spoof only the IP address associated with the server 130. Such a less restrictive spoofing directive may be sufficient for some less restrictive firewalls.

In one or more aspects, the server-server messages may be sent using an alternate protocol, such as TCP, SSL, TLS, QUIC, SPDY, etc. The server-server messages may describe the content of the spoofed packets before being spoofed. For example, an already open SPDY connection might be used to convey the messages from the server 130 to the server 160, and may include information about the spoofed IP and ports that could have been used in the packets. In one or more aspects, the server 160 may respond to the spoofed packets as though they were genuinely provided by the client 115. For example, the server 160 may proceed to provide the requested data resource, across a secured QUIC communication channel, without waiting for any other messages.

Referring to servers 130 and 160, each of the processors 234 and 264 may be a general-purpose processor (e.g., a central processing unit (CPU), a graphics processing unit (GPU), a microcontroller, a Digital Signal Processor (DSP), an Application Specific Integrated Circuit (ASIC), an FPGA, a Programmable Logic Device (PLD), a controller, a state machine, gated logic, discrete hardware components, or any other suitable entity that can perform calculations or other manipulations of information. The memory 240 and memory 270 may include random access memory (RAM), dynamic RAM (DRAM), static Ram (SRAM), flash memory, etc.

The network 150 may include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of network topologies, including a bus network, a star network, a ring network, a mesh network, a star-bus network, tree or hierarchical network.

FIG. 3 is a sequence diagram illustrating an example of a message flow 300 between the servers 130 and 160 and the client 115, in accordance with one aspect of the subject technology. The message flow 300 may start with the client application 115 sending a message 320 (e.g., the first connection) to the server 130 requesting a data resource (e.g., a web page, media content including one or more audio or video files, or a document including one or more text and/or image files, etc.). The server 130 may redirect the request by sending the message 340 to the server 160 directing the server 160 to respond to the request made by the client 115.

Prior to redirecting the request, the server 130 may send a number of server-server messages (e.g., 335) to the server 160. The server-server messages, as described above, may include similar content as a message that the client application 115 would have used to establish a second connection to the server 160. The server-server messages 335 may include preparatory data that the server 130 may receive from the client application 115 (e.g., 325). The preparatory data, as discussed above, may include cryptographic materials for encrypting messages for sending to the server 160 on behalf of the client 115. The server 130 may send one or more informative messages (e.g., message 332) to client 115 as discussed above. The informative messages may indicate details of connection initiation done by the server 130 via the one or more server-server messages 335.

The server 160 may respond to the request by sending the requested data resource to the client application 115 via the message 350. In an aspect, the server 160 may also provide the client application 115 with connection information that client application 115 can use to directly contact the server 160. Following receiving the requested data, the client may establish the second connection (e.g., 360) to the server 160. The client application 115 may use the connection information provided by the server 160 or the content of the informative messages to establish the second connection. The content of the informative messages, as discussed above, may include the details of connection initiation including actual IP and port addresses that can be used by the client application 115 to reach the server 160. In practice, the server 160 may be at a closer distance to the client device 115 than the server 130 and therefore, saving some latency.

As can be seen from the message flow 300, the required messaging for achieving the objective of providing the data resource that the server 130 could not provide may be limited to 320, 340, and 350. Therefore, the latency for achieving the above-mentioned objective, which with the existing solutions may amount to 3 Round-Trip Time (RTT) for connection establishment, can be reduced to 0 RTT with the application of the disclosed method of the subject technology. In other words, the subject technology facilitates a redirect or a "hand off" of service to a second server with negligible delay, relative to having the first server 130 serve the response over the Internet. Advantages of disclosed technology include a substantial latency improvement, as some areas of the world may routinely suffer, for example, a 300-400 ms RTT, and using the disclosed approach may save approximately 900-1200 ms of delay time for reducing the delay time by 3RTT.

FIG. 4 is a flow diagram illustrating an example of a method 400 for low latency redirection of UDP-based transport protocols traversing a client-side NAT firewall in accordance with one aspect of the subject technology. The method 400 may be performed at the server 130 of FIG. 2 (e.g., first server) and begins with operation block 410, where a request for directing a data resource to a client (e.g., 115 of FIG. 2) is received by the communication module 232 of FIG. 2. At operation block 420, the determination module 246 of FIG. 2 may determine a second server (e.g., server 160 of FIG. 2) for responding to the request. The request may be redirected to the second server. At operation block 430, the first server (e.g., server 130) may provide for the second server to connect to the client and directly respond to the request. The second server may have not been previously connected to the client.

FIG. 5 is a flow diagram illustrating an example of a method 500 for low latency server-side redirection of UDP-based transport protocols traversing a client-side NAT firewall, in accordance with one aspect of the subject technology. The method 500 may be performed at the server 160 of FIG. 2 (e.g., first server) and begins with operation block 510, where, at the first server, a request is received from a second server (e.g., server 130 of FIG. 2), for providing a data resource to a client (e.g., client application 115 of FIG. 2). The client has not been previously connected with the first server. At operation block 520, connection information for connecting to the client may be received from the second server. The data resource may be provided, at operation block 530, to the client based on the received connection information. The client may be protected by a firewall (e.g., 120 of FIG. 2) that can block unmarked data from traversing toward the client.

The second server may lack the requested data resource or resources for providing the requested data resource.

FIG. 6 is a flow diagram illustrating an example of a method 600 for low latency server-side redirection of UDP-based transport protocols traversing a client-side NAT firewall, in accordance with one aspect of the subject technology. The method 600 may be performed at the client device 110 by the client application 115 of FIG. 2, and begins with operation block 610, where the client may send a request (e.g., 112 of FIG. 1) for a data resource to a first server (e.g., 130 of FIG. 1). At operation block 620, the data resource may be received from a second server (e.g., 1630 of FIG. 1) that has not been previously connected to the client. Receiving the data resource from the second server may be facilitated by the first server through redirecting the request to the second server, and providing for the second server to connect to the client and directly respond to the request. The first server may lack the requested data resource or resources for providing the requested data resource.

It is to be understood that the disclosure is not to be limited to the disclosed embodiments but, on the contrary, is intended to cover various modifications and equivalent arrangements. Those of skill in the art would appreciate that the various illustrative blocks, modules, elements, components, methods, and algorithms described herein may be implemented as electronic hardware, computer software, or combinations of both. Skilled artisans may implement the described functionality in varying ways for each particular application. Various components and blocks may be arranged differently (e.g., arranged in a different order, or partitioned in a different way) all without departing from the scope of the subject technology.

The specific order or hierarchy of steps in the methods disclosed is an illustration of examples of approaches. The specific order or hierarchy of steps in the methods may be rearranged, e.g., based on design preferences. Some of the steps may be performed simultaneously or in an alternative order. Other embodiments are also within the scope of the following claims.

What is claimed is:

1. A computer implemented method comprising:
   receiving, at a first server, a request for directing a data resource to a client;
   determining a second server for responding to the request;
   receiving, from the client, preparatory data comprising cryptographic materials;
   sending constructed packets based on the cryptographic materials to the second server, the constructed packets including Quick UDP Internet Connection (QUIC) cryptographic HELLO packets;
   redirecting the request to the second server; and
   providing for the second server to connect to the client and directly respond to the request, wherein the second server has not been previously connected to the client.

2. The computer implemented method of claim 1, wherein:
   receiving the request comprises receiving the request from the client or a back-end server,
   the client is protected by a firewall comprising a Network Address Translation (NAT) firewall that blocks unmarked data from traversing toward the client,
   the unmarked data comprises a data packet that lacks an identifiable source address and a destination address,
   the data packet comprises a User Datagram Protocol (UDP) data packet or a Transmission Control Protocol (TCP) data packet,
   the identifiable source address comprises an Internet Protocol (IP) address of the first server,
   the destination address comprises an IP address of the client comprising a NAT produced IP address and a port address, and
   the identifiable source address further comprises a port address associated with the first server.

3. The computer implemented method of claim 1, wherein:
   the client comprises a browser,
   the request comprises a Hyper Text Transport Protocol (HTTP) request, and
   the data resource comprises at least one of a web page, media content comprising one or more audio or video files, or a document comprising one or more text and/or image files.

4. The computer implemented method of claim 1, wherein:
   the first server lacks at least one of the requested data resource or resources for providing the requested data resource, and
   determining the second server comprises determining that the second server is able to respond to the request with a comparable or a lower latency than the first server, if the first server directly responded to the request.

5. The computer implemented method of claim 1, further comprising:
   requesting from the second server to provide the client with the data resource with similar security as if the first server provided the client with the data resource; and
   sending a message to the client through a first connection used by the client to send the request to the first server;
   directing the client to form a second connection to the second server and acquire the data resource, wherein:
   the connection information comprises a key provided by the client to the first server; and
   the first and the second server are at least one of maintained by a same entity or are part of a single data center.

6. The computer implemented method of claim 1, wherein:
   the cryptographic materials comprises cryptographic materials for encrypting messages for sending to the second server on behalf of the client;
   the cryptographic materials comprise a client selected Globally Unique Identifier (GUID); and
   the cryptographic materials comprise a public key comprising a Diffie-Hellman public Key, or a master secret for constructing a session symmetric key.

7. The computer implemented method of claim 6, further comprising:
   sending the cryptographic materials to the second server as part of redirecting the request to the second server; and
   sending one or more server-server messages directly to the second server, wherein the one or more server-server message include similar content as a message the client had to use to establish a second connection to the second server, and wherein the one or more server-server messages include the preparatory data.

8. The computer implemented method of claim 6, further comprising:
   using the cryptographic data to construct packets that the second server would expect to receive from the client if the client had sent the request directly to the second server; and
   wherein:
   the constructed packets include a spoofed source IP and port addresses that match client NAT outbound IP and port addresses; and
   the constructed packets are provided to be capable of traversing the firewall.

9. The computer implemented method of claim 7, wherein:
the one or more server-server messages comprise attestation by the first server regarding the ownership of the source IP and port addresses,
the one or more server-server messages comprise a request that an initial second server's message to the client use at least one of a spoofed source IP address or a spoofed source port address, and
sending the one or more server-server messages comprises using an alternate protocol comprising TCP, Secure Socket Layer (SSL), Transport Layer Security (TLS), QUIC, and SPDY.

10. The computer implemented method of claim 8, further comprising sending informative messages to the client, wherein:
the informative messages indicates details of connection initiation done by the first server via the one or more server-server messages,
the details of connection initiation comprise actual IP and port addresses that can be used by the client to reach the second server, and
the details of connection initiation comprise the actual contents of the constructed packets or a packet sequence number used in the constructed packets, or at least portions of checksums or ElHash-based Message Authentication Codes (HMACs) of messages that is used to authenticate or validate future messages to be sent by the client to the second server on the second connection.

11. A system comprising:
memory comprising instructions; and
a processor configured to execute the instructions to:
receive a request for directing a data resource to a client;
determine a server for responding to the request;
receive, from the client, preparatory data comprising cryptographic materials;
send constructed packets based on the cryptographic materials to the second server, the constructed packets including Quick UDP Internet Connection (QUIC) cryptographic HELLO packets;
redirect the request to the server; and
provide for the server to connect to the client and directly respond to the request, wherein the server has not been previously connected to the client.

12. The system of claim 11, wherein:
the processor is further configured to execute the instruction to receive the request from the client or a back-end server;
the client is protected by a firewall comprising a Network Address Translation (NAT) firewall that blocks unmarked data from traversing toward the client;
the unmarked data comprises a data packet that lacks an identifiable source address and a destination address;
the data packet comprises the UDP data packet or a Transmission Control Protocol (TCP) data packet;
the identifiable source address comprises an Internet Protocol (IP) address of the system;
the destination address comprises an IP address of the client comprising a NAT produced IP address and a port address; and
the identifiable source address further comprises a port address associated with the system.

13. The system of claim 11, wherein:
the system lacks at least one of the requested data resource or resources for providing the requested data resource, and
the processor is further configured to execute the instructions to determine that the server is able to respond to the request with a comparable or a lower latency than the system, if the system directly responded to the request.

14. The system of claim 11, wherein the processor is further configured to execute the instructions to:
forward a request to the server asking the server to provide the client with the data resource with similar security as if the system provided the client with the data resource;
send a message to the client through a first connection used by the client to send the request to the system; and
forward to the client a request to form a second connection to the server to acquire the data resource; and wherein:
provide the server with connection information,
the connection information comprises a key provided by the client to the system; and
the system and the server are at least one of maintained by a same entity or are part of a single data center.

15. The system of claim 11, wherein:
the processor is further configured to execute the instructions to receive preparatory data from the client prior to redirecting the request to the server,
the cryptographic materials comprises cryptographic materials for encrypting messages for sending to the server on behalf of the client;
the cryptographic materials comprise a client selected Globally Unique Identifier (GUID); and
the cryptographic materials comprise a public key comprising a Diffie-Hellman public Key, or a master secret for constructing a session symmetric key.

16. The system of claim 15, wherein the processor is further configured to execute the instructions to:
send the cryptographic materials to the server as part of redirecting the request to the server; and
send one or more server-server messages directly to the server, wherein the one or more server-server message comprise similar content as a message the client had to use to establish a second connection to the server, and wherein the one or more server-server messages comprise the preparatory data.

17. The system of claim 15, wherein the processor is further configured to execute the instructions to use the cryptographic data to construct packets that the server expected to receive from the client if the client had sent the request directly to the second server; and to send the constructed packets to the second server, and wherein:
the constructed packets comprise Quick UDP Internet Connection (QUIC) cryptographic HELLO packets based on the preparatory data,
the constructed packets comprise spoofed source IP and port addresses that match client NAT outbound IP and port addresses, and
the constructed packets are provided to be capable of traversing the firewall.

18. The system of claim 11, wherein the processor is further configured to execute the instructions to send informative messages to the client, wherein:
the informative messages indicates details of connection initiation done by the system via the one or more server-server messages,
the details of connection initiation comprise actual IP and port addresses that can be used by the client to reach the server, and
the details of connection initiation comprise the actual contents of the constructed packets or a packet sequence number used in the constructed packets, or at least portions of checksums or Hash-based Message Authentication Codes (HMACs) of messages that is used to authenticate or validate future messages to be sent by the client to the server on the second connection.

19. A non-transitory machine-readable medium comprising instructions stored therein, which when executed by a machine, cause the machine to perform operations comprising:

receiving, at a first server, a request for directing a data resource to a client;
determining a second server for responding to the request;
receiving, from the client, preparatory data comprising cryptographic materials;
sending constructed packets based on the cryptographic materials to the second server, the constructed packets including Quick UDP Internet Connection (QUIC) cryptographic HELLO packets;
redirecting the request to the second server; and
providing for the second server to connect to the client and directly respond to the request, wherein:
the second server has not been previously connected to the client; and
receiving the request comprises receiving the request from the client.

* * * * *